United States Patent
Bakx

(10) Patent No.: US 7,986,598 B2
(45) Date of Patent: Jul. 26, 2011

(54) RECORDING METHODS AND DEVICES FOR RECORDING INFORMATION ON DUAL LAYER RECORDABLE DISKS

(75) Inventor: Johannus Leopoldus Bakx, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 210 days.

(21) Appl. No.: 10/562,896

(22) PCT Filed: Jun. 25, 2004

(86) PCT No.: PCT/IB2004/051011
§ 371 (c)(1),
(2), (4) Date: Dec. 29, 2005

(87) PCT Pub. No.: WO2005/004119
PCT Pub. Date: Jan. 13, 2005

(65) Prior Publication Data
US 2006/0158982 A1    Jul. 20, 2006

(30) Foreign Application Priority Data
Jul. 1, 2003   (EP) .................................. 03077059

(51) Int. Cl.
*G11B 7/00* (2006.01)
(52) U.S. Cl. .................... 369/47.5; 369/116; 369/13.39; 369/13.4

(58) Field of Classification Search ............... 369/13.39, 369/13.4, 280
See application file for complete search history.

(56) References Cited

U.S. PATENT DOCUMENTS

| | | | |
|---|---|---|---|
| 6,738,329 B2 * | 5/2004 | Hsiao | 369/47.53 |
| 2003/0063535 A1 * | 4/2003 | Shoji et al. | 369/47.53 |
| 2003/0137910 A1 * | 7/2003 | Ueda et al. | 369/47.14 |
| 2003/0227846 A1 * | 12/2003 | Lee et al. | 369/53.21 |
| 2004/0125738 A1 * | 7/2004 | Lee et al. | 369/275.3 |
| 2004/0156294 A1 * | 8/2004 | Watanabe et al. | 369/94 |

FOREIGN PATENT DOCUMENTS

| | | |
|---|---|---|
| CN | 1135632 A | 11/1996 |
| EP | 0715301 A2 | 6/1996 |
| EP | 1318509 A1 | 6/2003 |
| WO | WO 02086873 A1 * | 10/2002 |
| WO | 2005001824 A1 | 1/2005 |

* cited by examiner

*Primary Examiner* — Lixi Chow

(57) ABSTRACT

The invention relates to recording methods for recording information on a dual layer recordable disk, and to corresponding recording devices. In one such method and recording device the OPC-area is variably located on a layer of the disk. In a preferred embodiment the OPC-area is located relative close to the radius where the data stream switches from the first layer to the second layer. This reduced additional time required for jumping to a fixed OPC-area. Furthermore, in another such method and device the information to be recorded is equally divided over both layers of the dual layer disc. This avoids additional time required for finalization.

13 Claims, 3 Drawing Sheets

RECORDING METHODS AND DEVICES FOR RECORDING INFORMATION ON DUAL LAYER RECORDABLE DISKS

The invention relates to recording methods for recording information on a dual layer recordable disk, the methods comprising a step of performing an Optimum Power Control (OPC) procedure for determining an actual optimum writing power, said Optimum Power Control procedure being performed in an OPC-area on the disk. The invention further relates to the corresponding recording devices for recording information on dual layer recordable disks using these methods.

For recordable dual-layer media (both write-once and rewritable), such as for example DVD+R disks and DVD+RW disks, that need to be read-compatible with read-only dual-layer disks, there is the issue of how to deal with an amount of data that requires a storage space occupying more than one layer of the dual layer disk, but less than two full layers.

Figure 1:
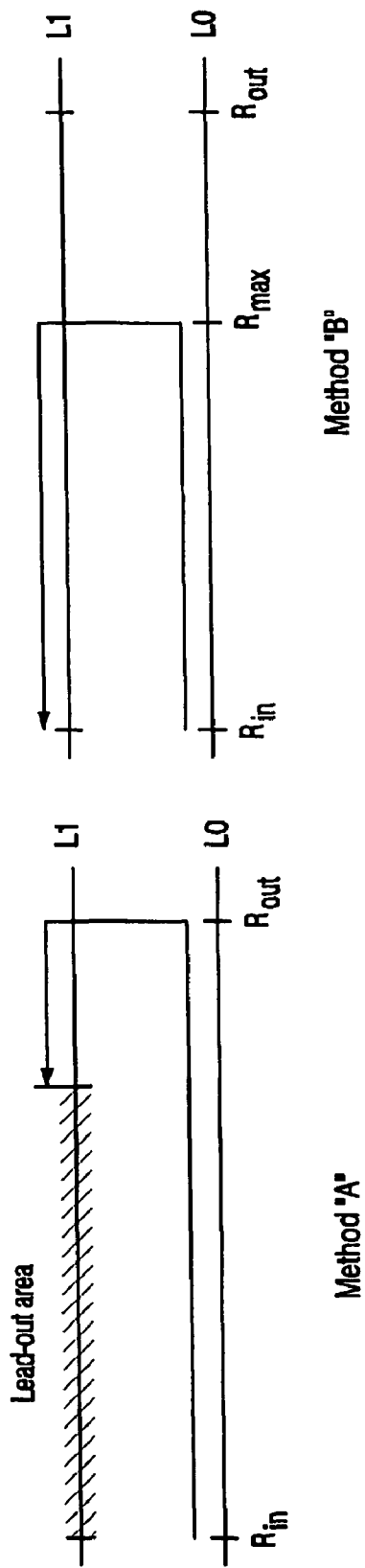
Figure 2:
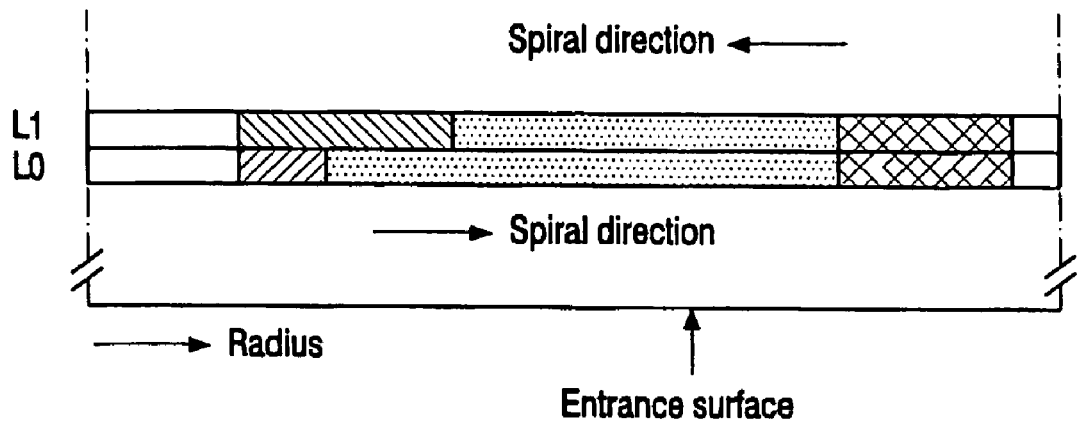
Figure 3:
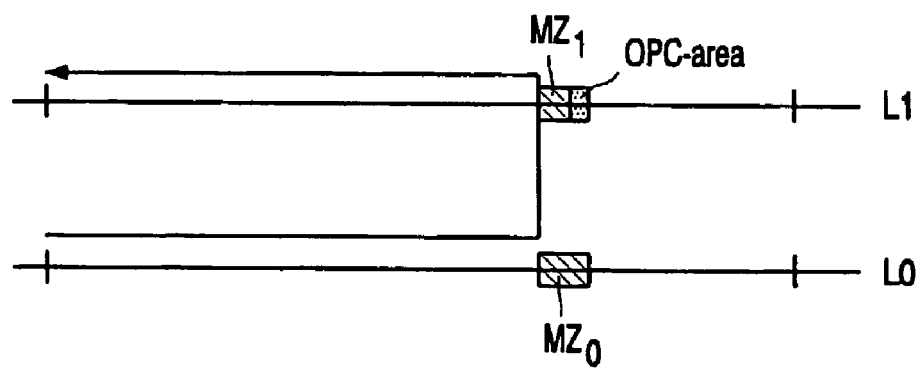
Figure 4:
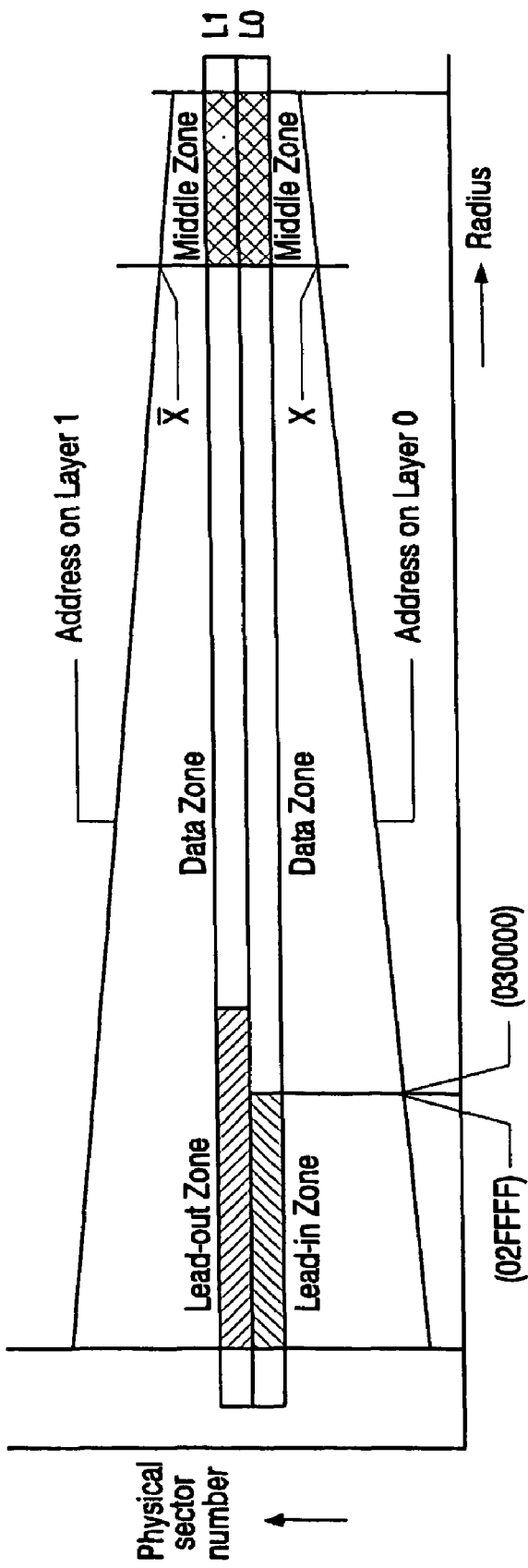

FIG. 1 is an illustration for recording on dual layer disks;
FIG. 2 is an illustration of opposite tracks paths;
FIG. 3 is an illustration of layer jump;
FIG. 4 is an illustration of the Middle Zone.

A first recording method for recording information on such a dual layer recordable disk, method A, is depicted in the left-hand side of FIG. 1. In this method, first a first layer L0 is written completely full, and subsequently the remainder of the data is written on a second layer L1. A second recording method for recording information on a dual layer recordable disk, method B, is depicted in the right-hand side of FIG. 1. In this method according to the present invention, the data to be written is equally divided between both layers L0 and L1.

Here L0 is defined to be the layer closest to the recording lens in a recording device, and therefore also closest to the entrance surface of the laser beam in the disk. L1 is the other layer. In order to clarify this more, the layout of a dual layer DVD-ROM disk according to Standard ECMA-267 is depicted in FIG. 2 for a so-called OTP (Opposite Track Path) disk. As is described in this Standard, the spiral direction of layer L0 is opposite to the spiral direction of layer L1 in an OTP type disk.

In method A, first layer L0 is written from radius $R_{in}$ to $R_{out}$ (which are 24 mm and 58 mm for DVD type media). Next, the laser spot (used for recording the data in a layer) jumps from layer L0 to layer L1 and the remainder of the data is written. Depending on the amount of data to be recorded on the disk, layer L1 is written up to a certain radius. However, in order to guarantee playback on existing DVD players (especially DVD-Video and DVD-ROM players), the remaining part of layer Ll must be written also (for example with dummy data). This is because some players immediately jump from one layer to the other layer when the target of a seek command is located on the other layer. If no data were to be found after the layer jump (because the location jumped to does not have any data recorded there), the player is very likely to crash and/or report a fatal error as no tracking can be performed in the absence of data written on the disk at that location. By writing a long lead-out area, as is shown in the left-hand side of FIG. 1, compatibility with existing DVD players can be assured. However, this may require lengthy additional time to write the lead-out area ('finalization').

This additional time is avoided by applying recording method B. Here the data is equally divided between both layers L0 and L1, which implies a certain maximum radius $R_{max}$ beyond which no data is written on both layer L0 and layer L1. The value of $R_{max}$ is variable and depends on the amount of data to be recorded on the disk.

However, another problem occurs during recording. When the laser spot jumps from layer L0 to layer L1, an Optimum Power Control (OPC) procedure has to be carried out on layer L1 before the recording can proceed. As is well-known to a person skilled in the art, an Optimum Power Control procedure is a procedure for determining the actual optimum writing power for recording information on a layer of a disk. This optimum writing power depends on the disk, the recorder, and the recording speed that is actually used. Therefore, this optimum writing power should be determined for each recorder/disk combination at the actual recording speed. This Optimum Power Control procedure is generally performed in a fixed area on the disk that is specially reserved for this purpose, the so-called OPC-area.

When this OPC-area is located at the inner or outer radius of the disk, as is the case for single-layer media, first an access to that (inner or outer) radius must be carried out. This jump requires a certain amount of extra time. Especially when recording is done in CLV-mode, where a jump involves a change in disk rotation speed, a considerable amount of extra time may be required. During this extra time the data stream generally continues, which has to be captured in a memory buffer. Therefore such a buffer has to be larger than when no jump is needed. It is noted that the OPC procedure is performed "on the fly" when switching from layer L0 to layer L1.

It is a further object of an embodiment to provide a method in which the amount of extra time is reduced. This object is achieved by providing a method wherein the Optimum Power Control procedure is performed in an OPC-area variably located on at least one of the layers (L0, L1) of the dual layer disk.

The method and recorder according to an embodiment employ a variable position of the OPC-area, the position depending on the amount of data to be recorded on the disk. In another embodiment the method and recorder use an OPC-area positioned on the second layer, Ll, located relatively close to the radius where the data stream switches from the first to the second layer (such as $R_{max}$ in method B). This radius depends on the amount of information to be recorded on the disk.

In a version of a method according to another embodiment, the OPC-area is located in the so-called Middle Zone of layer L1 in order to realize a fast "on-the-fly" OPC-procedure at the radius of the layer jump (as is shown in FIG. 3, where MZ0 denotes the part of the Middle Zone located in layer L0 and MZ1 denotes the part of the Middle Zone located in layer L1). This Middle Zone is defined for DVD-ROM disks in the above-mentioned Standard ECMA-267.

According to Standard ECMA-267, the Information Zone (or Data Zone) has a Middle Zone in each layer to allow the laser spot to move from layer L0 to layer L1. This is shown in FIG. 4. The Middle Zone can be considered as a kind of intermediate lead-out area on a dual layer disk. According to the standard, the Middle Zone extends 1 mm beyond the last written location on layer L0. This is sufficient to incorporate an OPC-area. It is noted however that the OPC-area may extend beyond the 1 mm boundaries of the Middle Zone.

It should be noted that embodiments can provide an additional advantage in more accurately determining the optimum writing power after a layer jump. If, after a layer jump, an OPC-procedure were to be performed at the inner or outer radius of the disk, this would not lead to optimum power control because the OPC-procedure is being performed at a position that is different from the start position of the actual recording on layer L1. The properties of the disk at the outside can vary from the properties at the actual recording position.

In another embodiment, a further Optimum Power Control procedure is performed in a fixed and reserved OPC-area. Similar to single layer disks, such a fixed OPC-area may be located at the inner radius and/or the outer radius of the disk. This further Optimum Power Control procedure may, for example, be performed to determine an initial optimum writing power to be used when starting writing on layer L0. Furthermore, an initial optimum writing power may be determined for each of the layers individually.

Although various embodiments have been described above, it will be evident that other embodiments may be alternatively used to achieve the same object. The scope of the invention is therefore not limited to the embodiments described above, but can also be applied to all kinds of recordable media (both write-once and rewritable), such as for example DVD+R, DVD+RW, DVD-R, DVD-RW, DVD-RAM, and Blu-ray Disk.

Furthermore, the embodiments described above detail writing data first to layer L0 and subsequently to layer L1. However, it should be noted that embodiments work equally well when data is written first to layer L1 and subsequently to layer L0. Moreover, the scope of the invention is not limited to dual layer disks only, but can be applied on multiple layer disks consisting of more than two layers for storing data as well.

The invention claimed is:

1. A recording method for recording a user data stream on a dual layer recordable disk having a first layer and a second layer, the method comprising an act of performing an Optimum Power Control (OPC) procedure for determining an actual optimum writing power, said Optimum Power Control procedure being performed in variably located OPC-areas on the disk that are variably located on the first layer and the second layer, at least one of the variably located OPC-areas is positioned on the first or second layer and located relatively close to a radius where the user data stream switches from the first layer to the second layer, wherein a first user data area extends from a lead-in zone of the first layer to a radius R1 of the of the first layer, and a first middle zone and a second user data area extends beyond radius R1 of the first layer, and a third user data area extends from a lead out zone to a second radius R2 in the second layer, and a second middle zone and a fourth user data area extends beyond radius R2, wherein approximately half of the user data stream is written to each of the first and third user data areas, and substantially none of the user data stream is written to the second and fourth user data areas, and at least one OPC-area is in at least one of the first middle zone and the second middle zone.

2. The recording method as claimed in claim 1, wherein a location of the at least one of the variably located OPC-areas depends on an amount of the user data stream to be recorded on the disk.

3. The recording method as claimed in claim 1, comprising a further step of performing a further Optimum Power Control (OPC) procedure, said further Optimum Power Control procedure being performed in a further OPC-area located at a fixed position on at least one of the layers of the dual layer disk and reserved for use by the further Optimum Power Control procedure.

4. The recording method as claimed in claim 3, wherein the further Optimum Power Control procedure is performed in a first fixed OPC-area located on the first layer and in a second fixed OPC-area located on the second layer.

5. The method of claim 1 wherein the user data stream to be recorded is substantially equally divided between the first layer and the second layer.

6. The method of claim 1 wherein the first and second middle areas that contains none of the user data stream, and the first and second middle areas are approximately equal in size and approximately coextensive, and the first and third user data areas are approximately equal in size and approximately coextensive.

7. The method of claim 1 wherein the disk has a data size and the user data stream has a data size that is substantially less than the data size of the disk and the difference in the data size of the user data stream and the data size of the disk results in unused data area of the disk, and the unused data area is divided approximately equally between the second user data area of the first layer and the fourth user data area of the second layer, and the second user data area of the first layer is approximately coextensive with the fourth user data area of the second layer.

8. The method of claim 1 wherein:
a data size of the user data stream stored on the dual layer recordable disk is variable, and a size and location of the lead-out area is independent of the data size.

9. A recording device for recording a user data stream on a dual layer recordable disk having a first layer and a second layer, the device comprising:
means for performing an Optimum Power Control (OPC) procedure for determining an actual optimum writing power, said Optimum Power Control procedure being performed in variably located OPC-areas on the disk that are variably located on the first layer and the second layer, at least one of the variably located OPC-areas is positioned on the second layer and located relatively close to a radius where the user data stream switches from the first layer to the second layer; and
means for writing the user data stream on the dual layer disk using the determined optimum writing power,
wherein a first user data area extends from a lead-in zone of the first layer to a radius R1 of the of the first layer, and a first middle zone and a second user data area extends beyond radius R1 of the first layer, and a third user data area extends from a lead out zone to a second radius R2 in the second layer, and a second middle zone and a fourth user data area extends beyond radius R2, wherein approximately half of the user data stream is written to each of the first and third user data areas, and substantially none of the user data stream is written to the second and fourth user data areas, and at least one OPC-area is in at least one of the first middle zone and the second middle zone.

10. A recording method for recording a user data stream on a dual layer recordable disk having a first layer and a second layer, a lead-in zone, a user data area for recording user data and a lead-out zone, the method comprising an act of performing an Optimum Power Control (OPC) procedure for determining an actual optimum writing power, said Optimum Power Control procedure being performed in an OPC-area in a middle zone that separates the user data area into a first user data area and a second user data area, a location of the middle zone depending on an amount of data in the user data stream to be written on the disk, wherein the first user data area extends from the lead-in zone of the first layer to the middle zone, and the second user data area extends beyond the middle zone to a remainder of the first layer, and wherein approximately half of the user data stream is written to each of the first and third user data areas, and substantially none of the user data stream is written to the second and fourth user data areas.

11. A recording device for recording a user data stream on a dual layer recordable disk having a first layer and a second layer, a lead-in zone, a user data area for recording user data and a lead-out zone, the device comprising:
means for performing an Optimum Power Control (OPC) procedure for determining an actual optimum writing power, said Optimum Power Control procedure being performed in an OPC-area in a middle zone that separates the user data area into a first user data area and a second user data area, a location of the middle zone depending on an amount of data in the user data stream to be written on the disk;
means for writing the user data stream on the dual layer disk using the determined optimum writing power,
wherein the first user data area extends from the lead-in zone of the first layer to the middle zone, and the second user data area extends beyond the middle zone to a remainder of the first layer, and substantially none of the user data stream is written to the second user data area.

12. A recording method for recording a user data stream on a dual layer recordable disk, the disk having a first layer with a lead-in zone and a first user data zone and a second layer with a second user data zone and a lead out area, the method comprising performing an Optimum Power Control (OPC) procedure for determining an actual optimum writing power, said Optimum Power Control procedure being performed in an OPC-area on the disk, wherein the Optimum Power Control procedure is performed in an OPC-area variably located on at least one of the layers of the dual layer disk, and wherein the OPC-area is in a middle zone, the user data stream being written in portions of the first and second data zones using the determined optimum write power, the middle zone separating one of the first user data zone and the second user data zone into two areas including a third user data zone, wherein substantially none of the user data stream is written to the third user data zone.

13. A recording device for recording a user data stream on a dual layer recordable disk, the disk having a first layer with a lead-in zone and a first user data zone and a second layer with a second user data zone and a lead out area, the device comprising:
means for performing an Optimum Power Control (OPC) procedure for determining an actual optimum writing power, said Optimum Power Control procedure being performed in an OPC-area on the disk, wherein the Optimum Power Control procedure is performed in an OPC-area variably located on at least one of the layers of the duel dual layer disk, and wherein the OPC-area is in a middle zone; and
means for writing the user data stream in portions of the first and second data zones on the dual layer disk using the determined optimum writing power;
wherein the middle zone separates one of the first user data zone and the second user data zone into two areas including a third user data zone, wherein substantially none of the user data stream is written to the third user data zone.

* * * * *